UNITED STATES PATENT OFFICE.

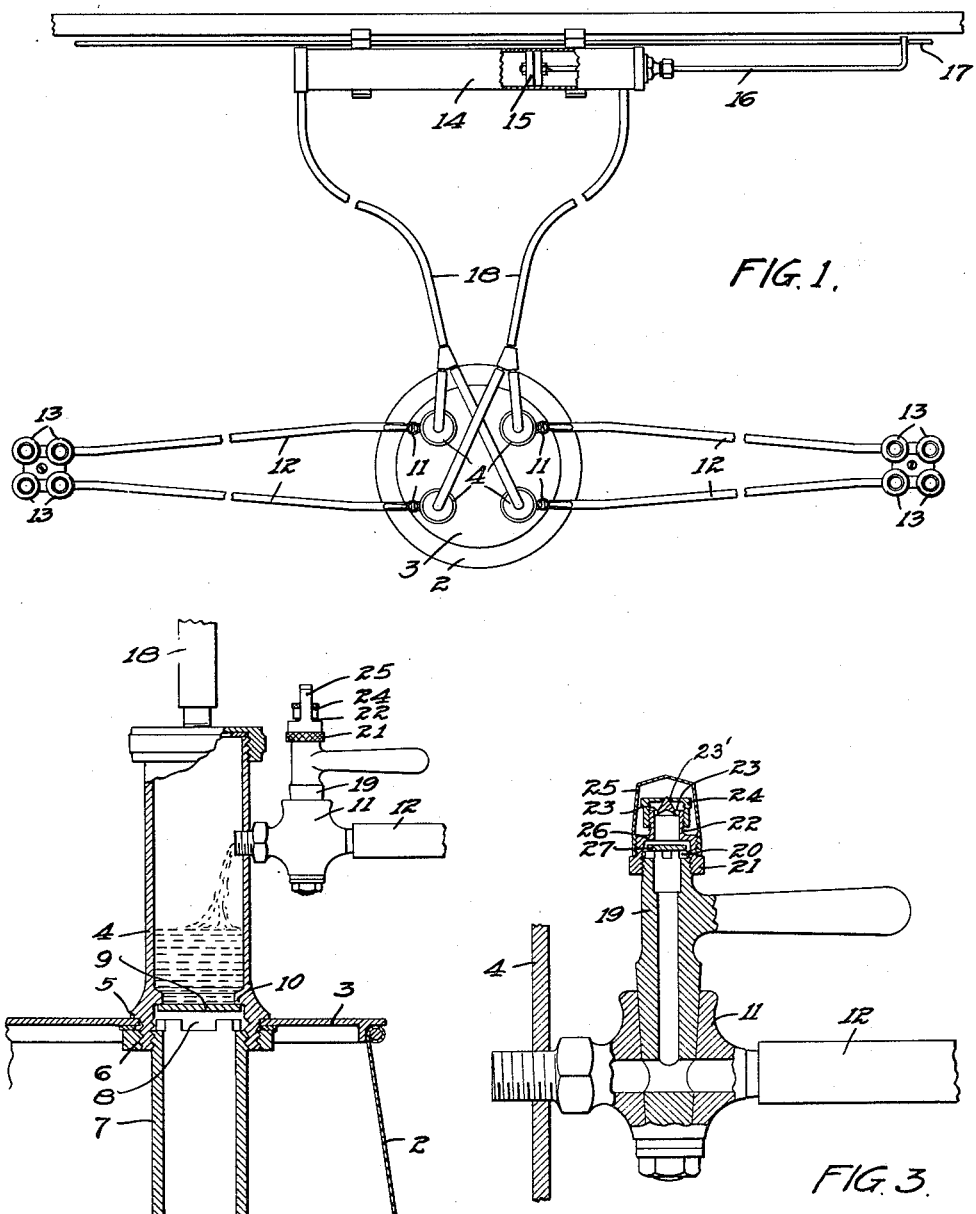

MARK J. MURPHY AND HARRY H. BRANDEAU, OF ST. PAUL, MINNESOTA.

MILKING-MACHINE.

1,218,447.    Specification of Letters Patent.    Patented Mar. 6, 1917.

Application filed March 20, 1916. Serial No. 85,410.

*To all whom it may concern:*

Be it known that we, MARK J. MURPHY, citizen of the Dominion of Canada, and HARRY H. BRANDEAU, citizen of the United States, residents of St. Paul, county of Ramsey, State of Minnesota, have invented certain new and useful Improvements in Milking-Machines, of which the following is a specification.

In the use of a milking machine where two cows are milked at the same time, objection has been made by dairymen to applying the same degree of suction to an easy and a hard milking cow, and this has been found unavoidable where two teats of two cows are subjected to the milking suction at the same time.

The object of our invention is to provide an attachment for the milking machine by means of which the person in charge of the milking operation can easily and quickly vary the degree of suction and adapt the device for easy and hard milkers.

The invention consists generally in means for opening a passage from a suction tube to the atmosphere to cut down the degree of suction at the milking cups.

The invention further consists in various constructions and combinations, all as hereinafter described and particularly pointed out in the claims.

In the accompanying drawings forming part of this specification,

Figure 1 is a plan view of a milking machine embodying our invention,

Fig. 2 is a detail sectional view of a portion of the milk receptacle and one of the milk receivers, showing our improvement mounted in one of the suction tubes, Fig. 3 is a detail view of the regulating device.

In the drawing, 2 represents a milk receiver having an open top in which a cover in the form preferably of a flanged disk 3 is seated. The disk is provided with holes, preferably four in number, to receive the lower threaded end of a tubular milk receiver 4 having a flange 5 that is seated on the disk and a nut 6 engaging the threaded end of the receiver and locking it securely in the hole in the disk. An extension 7 is mounted in the lower end of the receiver and has notches 8 for the passage of the milk and a valve 9 is arranged to be drawn up by the suction to close the bottom of the milk receiver and drop down by gravity or be forced down by the pressure when it is desired to discharge the milk into the receptacle beneath. The milk flows around the edge of the valve into the recesses 8.

10 is a rib or seat, forming a stop for the upward movement of the valve. A valve cock 11 is mounted in the wall of the receiver and is provided with a tube 12. By means of this valve the passage through the tube may be entirely closed whenever desired. This tube leads to the teat cups 13 arranged in groups of four, two of each group being connected to one milk receiver and the other two to the adjacent milk receiver, all as substantially set forth in our pending application for Letters Patent of the United States, Serial No. 82,535, filed March 7, 1916.

14 is a pump of the single cylinder, double-acting type, having a piston 15 and a rod 16 connecting the piston with a reciprocating bar 17 operated from a suitable source of power, not shown. Tubes 18 connect the opposite ends of the cylinder with the diagonally opposite milk receivers, as shown in Fig. 1, so that with the movement of the cylinder piston in one direction suction will be applied to two of the teat cups of one group and two of the teat cups of the other group and as the piston is reciprocated, this suction will be alternated from one pair of milk receivers to the other, all as described in our application above referred to, the object being to milk the cows in a manner approaching hand milking as nearly as possible, milking two teats of each cow at the same time instead of four teats, which might be done with a milking machine.

It often happens in milking two cows that one is an easy and the other a hard milker and if sufficient suction is provided for the hard milking cow it is too much for the easy milker, and dairymen object to applying more suction to the teat cups than is necessary to milk the cow dry, and as all users of milking machines prefer to milk only two teats at the same time, we have devised a means for regulating the suction which the person in charge of the milking operation can easily and quickly regulate to suit the characteristics of the different cows.

This regulating feature consists in providing means for reducing the degree of suction in the tube leading to either pair of milking cups and to accomplish this we provide a passage 19 in the stem of the valve cock 11 leading to the suction passage in the tube 12. The stem is exteriorly threaded and has notches 20 in its end communicating with the passage 19. An interiorly threaded cover 21 is fitted over said threaded stem and is provided with an upwardly projecting exteriorly threaded stud 22 having ports 23 therein and a cap 24 that is threaded to engage the threads of said stud and is movable thereon to open or close a port 23' in the cap 24 positioned to receive a cone-shaped projecting end of the stud 22. The adjustment of the cap up and down regulates the passage of air through the port 23'. A loop 25 is preferably provided for preventing the cap from being entirely removed from the stud.

Within the cover is a seat 26 and a loose valve 27 is adapted to fit said seat when the pressure is on the valve and tube to open the milk receiver valve and expel the milk and prevent the air from escaping through the ports in the stud. On the suction stroke this valve is drawn down upon the end of the stem to close the passage therethrough but allows air to enter said passage from the atmosphere through the notches 20, the volume of this air passing in from the atmosphere depending, of course, upon the adjustment of the cap 24 and the freedom with which air is allowed to enter the ports in the stud. The attendant is therefore able by the adjustment of this cap to regulate the volume of air entering the suction tube from the atmosphere and the degree of suction at the milk cups. For a hard milking cow, this cap may be nearly closed; for a very easy milking cow, adjusted in a nearly open position, and each valve cock being equipped with this regulating device, the suction at the milk cups can be regulated to a nicety, according to whether the cow is a hard or easy milker. On the compression stroke of the pump, the valve disk will be forced outwardly, closing the passage in the stud and preventing the escape of air and thereby the opening of the valve in the milk receptacle and the discharge of the milk will be insured. This regulating device may, of course, be mounted at any point in the apparatus where it will be effective for controlling the degree of suction at the milking cups.

In various ways the device may be modified, the essential feature being the means for opening communication of the suction tube with the atmosphere for the purpose of regulating the degree of suction in the tube.

We claim as our invention:

1. In combination, with a suction milking device, a means for establishing communication between the suction passage and the atmosphere for varying the relative degree of suction at the milking cups.

2. The combination, with a milking device having suction passages and means located near the milk receivers for opening communication between said passages and the atmosphere for varying the relative degree of suction in said passages, said means closing said communication automatically when pressure is applied to said passages.

3. In combination, with a milking device comprising a pump, milk receivers and milk cups therefor and tubes having suction passages connecting said receivers and said cups with said pump, and a valve device communicating with one of said passages for regulating the degree of suction therein, and in the cups connected with said passage, for the purpose specified.

4. A milking machine comprising milk receivers, milk cups arranged in groups of four cups each, a tube connecting a pair of cups in each group with a milk receiver, a pump having tube connections with milk receivers for the pairs of cups of different groups and a valve provided in connection with each tube leading to a milk receiver for opening communication between the suction passages in said tubes and the atmosphere for varying the degree of suction at one pair of cups of a group with respect to the cups of the other pair.

5. The combination, with a milk receiver, of a pair of milk cups, a tube leading therefrom to said milk receiver, a valve mounted in said tube and having a passage therein communicating with the atmosphere, a cap for regulating the entrance of air to said passage, said valve having means operated when pressure is forced into said passage for closing said passage.

In witness whereof, we have hereunto set our hands this 17th day of March, 1916.

MARK J. MURPHY.
    HARRY H. BRANDEAU.

Witnesses:
    M. P. MORIARTY,
    C. MOLITOR.